Cope & Hodgson,

Governor.

No. 1,804. Reissued July 8, 1861.

UNITED STATES PATENT OFFICE.

NATH. COPE AND WM. HODGSON, OF CINCINNATI, OHIO.

BUTTERFLY-VALVE.

Specification forming part of Letters Patent No. 23,902, dated May 10, 1859; Reissued July 2, 1861, No. 1,204.

*To all whom it may concern:*

Be it known that we, NATHAN COPE and WILLIAM HODGSON, of Cincinnati, in the county of Hamilton and State of Ohio, have invented certain new and useful Improvements in Butterfly-Valves; and we do hereby declare the following to be a full, clear, and exact description of the same, reference being had to the accompanying drawings, making a part of this specification.

Figure 1:
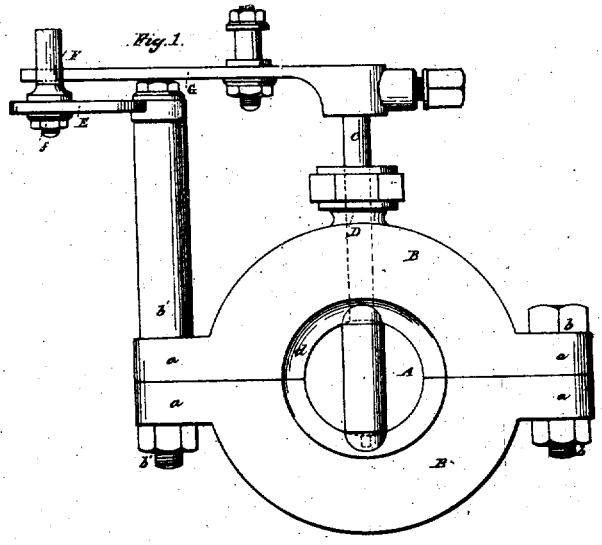
Figure 4:
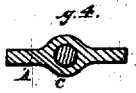
Figure 2:
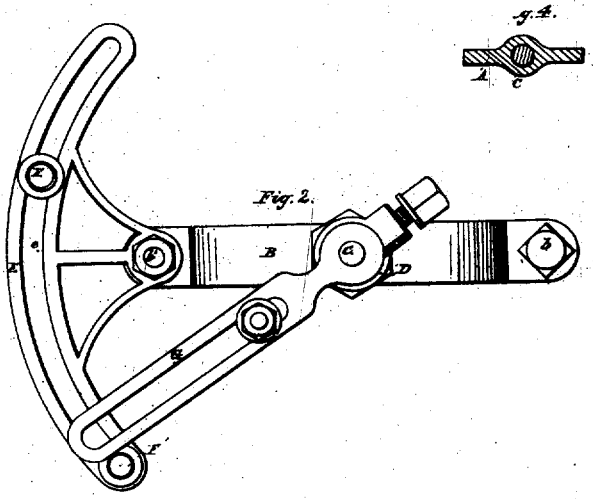
Figure 3:
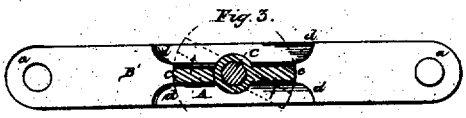

Figure 1 is a view of the valve and its box in form to be applied as a steam engine regulator or throttle, in connection with a governor. Fig. 2, is a view of the same looking from the top of Fig. 1. Fig. 3 is a section taken centrally through the valve and box, in a plane perpendicular to the axis of the valve. Fig. 4 is a section through the valve slightly changed in form.

Our valve is not only intended as a governor throttle valve, but as a cut off valve for steam engines, or for any other purpose in which a close fitting, or correctly balanced valve may be required.

To enable others skilled in the art to make and use our invention we will proceed to describe the same with reference to the drawings.

A, represents the valve which is of the usual thickness of throttle valves, it being a central section of a sphere, having its face or perimeter of a spherical form. The central portion of the valve may be enlarged or swelled out; so that when bored out it may receive a spindle C, by which it is properly confined to its external case B, and turned therein with a free, easy, and exceedingly sensitive motion as to the friction of its parts.

To provide for the insertion of the valve in the case, or valve box, as well as for convenience in accurately forming the valve seat, within the same, said valve case or box, must be divided in two parts, through the greatest diameter of the concentric spherical surface of the seat *c*, the division may be in a plane passing right through the axes of the spindle longitudinally (see valve box Fig 3, *h*, *h*,) or perpendicular thereto the latter mode is shown in the drawings at Fig. 1, and has some practical advantages. Said parts are held together either by screw bolts *b b′* and nuts E′, passing through lugs *a*, *a*, cast, or wrought thereon, or by other fastenings as best suits the particular mode of division adopted.

The valve seat *c*, Fig. 3 is in form a central section of a hollow sphere, and its diameter must correspond with the diameter of the valve plate A, that snugly and closely fits within its circular steam aperture.

The faces of the outer case or valve box as seen at B, B, Fig. 3 are countersunk or cut away either in a concave form, differing from the original Watt governor throttle valve; so as to leave in either construction the width of the seat, very nearly the same as the face or spherical portion *a*, of the plate of the valve, by reason of which a less range of motion, will open, and close, the way closed by this valve than where it fitted within a parallel pipe or chamber like the ordinary butterfly governor throttles in common use. Consequently the steam way or opening made by it more nearly resembles a parallel opening than such a valve revolving within a parallel pipe, seat, or chamber, or any seat that has a greater width of face than the thickness of the plate of the valve, because the valve at the commencement of its opening moves more directly away from its seat, and ends when fully open at or near a right angle with said seat, thus making the decrease in the latter half or portion of its opening about equal to the rate or ratio of increase in the first half, thus in effect being about equal or equivalent to a parallel opening or steam way throughout its range of motion, whereas in case of a valve fit within a parallel pipe, seat, or chamber, the valve when moving from the closed toward the fully open position commences by moving nearly parallel with the face of the chamber or pipe, and ends with said valve face being about or nearly at right angles to the face of said chamber, thus making a steam way or opening that increases throughout the whole range of motion of the valve, in an inconstant ratio of increase similar to all circular apertures.

It is obvious that a slight range of motion of our valve will as it leaves its seat open a greater area for steam than in the ordinary butterfly throttle valve and for the reasons stated, and thus cause it to more instantaneously act. This is important in connection with steam as it proportionally diminishes the range of the governor, which relieves it proportionally of the excess of impulses imparted to it by the changes or variation in the load or duty of the engine causing frequently in the action of the valve a succession of vibrations or oscillations, from the governor to the valve, and from the valves irregularity of supply of steam back to the engine and so on, continuously, to obviate which, We find by properly controlling the excesses of motion in the closing of the valve, it has the effect of as properly controlling the opposite extreme (viz. the opening). All governor throttles are liable to close too long then suddenly to open too wide. One extreme begets the other. This is particularly the case to a great degree where a considerable change of duty occurs to the engine or where there is a lack of momentum in the fly wheel, or bad attachments between the engine and governor, all of which affect the perfect action of the valve, causing it to retard in one case and then suddenly open too far. In our invention we obviate these extremes of closing and opening, by causing the valve to be adjusted, by the lever which opens, closes, or moves it. So that the most sensitive motion given to the lever by any power, connected, or applied to it, is communicated to the valve, the valve following that sensitive motion, and no other, as will be hereafter described.

It will be perceived that the area of opening through the valve case B, in which the valve fits is the same as the area of the valve the two spherical surfaces of the valve and seat closing accurately the orifice, the regulator or stop that defines the closing of the valve being applied externally or outside as will be explained.

*b′*, is a column which may serve as one of the screw bolts for holding the valve case B, together. On its top may be held by a nut or otherwise a regulating plate E which for the purpose of defining the extent of motion of the valve may be made in the arc of a circle, of which the stem or spindle C is the center, said stem also being in the center of the valve. This arc or regulating plate E is furnished with a curved slot *s*, in which the stop F, may be adjusted so as to allow the valve to entirely close up the opening through the valve case, or only partially so as circumstances may require. The more difficult an engine is to regulate or control the greater the benefit derived from adjusting said stop so as to prevent the valve from closing. Therefore we so adjust said stop F, that the steam way or opening left may be of sufficient capacity to allow enough steam to pass (when up to its maximum pressure) to the unloaded engine to drive it to nearly its required speed. There is another stop which can be adjusted in said slot. This latter stop performs a rather negative duty and not an active one, as the stop F, does, which will be explained hereafter.

Where the stem passes through the valve case B, it is packed in the usual well known manner but it is obvious that a packing box becomes unnecessary if the spherical faces of the valve and seat accurately fit each other as in that case no steam could pass or escape around the spindle.

On the outer end of the protruding valve stem is placed a lever or arm K, which when properly adjusted there may be held by a set screw L, as seen at Figs. 1 and 2, so that power applied of any kind through said lever or arm G, may turn the valve stem and consequently the valve connected with it. The lever G for the purpose of applying a governor to it by which the valve may be operated, may have a slot M, in it, and a stud N, to be moved or to be clamped therein for defining the extent of motion of said lever, when the stop F is moved to the end of the slot *e*, as seen at Fig. 2, and the arm G is brought to or against it, the valve may stand across the opening in the valve case. This however can be varied at pleasure either by the position of the arc E, on its column or support *b′*, or the position of the lever G, on the valve stem C, and is only assumed by way of illustration.

In many cases it may be important or indispensable not to close the valve A fully, but to leave a suitable steam way or opening through the valve case. It is only necessary to move the stop F, sufficiently to catch the arm G, before the valve fully occupies the opening, and of course it there stands until moved again by the lever.

Any of the above-named adjustments can effect the same object, so that we do not confine ourselves to the particular kind of adjustment, so long as we can open, close, regulate, or adjust, externally the opening or closing of the valve. Nor yet do we confine ourselves to combining said mode of adjustment to governor valves having spherical shaped seats as it may also be applied to those having parallel seats and otherwise with equal success.

The object of the stop N, is to pevent the valve arm G, from getting on the wrong side of its duty as it might accidentally, or by design, be made to do, it is a guard against any such accident. The valve can turn clear around through the circular opening in the case or valve box without damage to either, but where the valve is used in connection with a governor or a cut off if allowed a motion of this uncertain kind might do immense damage hence the precaution of the stop N.

We have for the purpose of correctly ascertaining the effect of the spherical concavity of the valve seat as used by us, upon the opening or steam passage of the valve caused careful mathematical calculations to be made, as compared with a valve of precisely the same diameter and thickness, a description of which is given in Gardiner's work on the steam engine 7th London edition, page 207, being known as the Watt throttle valve, the latter valve having a cylindrical, but not concave seat. The result of such calculations shows that when our valve has arrived at the point of opening, the other valve by reason of its parallel seat had made an opening or steam way equal to the 0.009 part of a square inch in area, the thickness of the seat in both cases being the same as the plate of the valve and the valve movements being equal in both.

We are aware that the openings controlled by the valves of steam engines have had gradually increasing capacities from the closed to the open position, hence we do not claim this broadly, as said feature is found in many of the oldest valves, but

Having thus fully described our invention what we claim as new and desire to secure by Letters Patent is—

1. Making the opening or openings controlled by the governor valves of steam engines of gradually increasing capacity from the closed to the open position when the valve and case are constructed and arranged to operate substantially in the manner herein specified 2. Controlling the excess of motion imparted to governor valves by means of the adjustment herein represented and described.

In witness that we claim the foregoing we have hereunto set our hands in the presence of witnesses this 22d day of March 1861.

NATHAN COPE.
WILLIAM HODGSON.

Witnesses:
M. Straub,
H. N. Clark.

[First printed 1911.]